US011774599B2

(12) United States Patent
Mesadi et al.

(10) Patent No.: US 11,774,599 B2
(45) Date of Patent: Oct. 3, 2023

(54) JOINT COST ESTIMATION FOR ASSOCIATING A DETECTION-TRACKLET PAIR TO AN OBJECT

(71) Applicant: Aptiv Technologies Limited, St. Michael (BB)

(72) Inventors: Fitsum Babu Mesadi, Troy, MI (US); Yang Wang, Novi, MI (US)

(73) Assignee: Aptiv Technologies Limited, St. Michael (BB)

( * ) Notice: Subject to any disclaimer, the term of this patent is extended or adjusted under 35 U.S.C. 154(b) by 20 days.

(21) Appl. No.: 17/515,175

(22) Filed: Oct. 29, 2021

(65) Prior Publication Data
US 2023/0136029 A1 May 4, 2023

(51) Int. Cl.
*G01S 19/14* (2010.01)
*G01S 19/24* (2010.01)

(52) U.S. Cl.
CPC ............. *G01S 19/14* (2013.01); *G01S 19/24* (2013.01)

(58) Field of Classification Search
CPC ................................ G01S 19/14; G01S 19/24
USPC .................................................... 342/357.63
See application file for complete search history.

(56) References Cited

U.S. PATENT DOCUMENTS

| 2021/0318425 | A1 | 10/2021 | Jeong et al. | |
|---|---|---|---|---|
| 2022/0034998 | A1* | 2/2022 | Lombardo | G01S 7/40 |
| 2022/0094397 | A1* | 3/2022 | Wu | H04B 7/0617 |

FOREIGN PATENT DOCUMENTS

| EP | 3422042 A1 | 1/2019 |
|---|---|---|
| EP | 3851870 A1 | 7/2021 |

OTHER PUBLICATIONS

"Partial European Search Report", EP Application No. 22197388.6, dated Mar. 7, 2023, 19 pages.
"Extended European Search Report", EP Application No. 22197388. 6, dated Jun. 7, 2023, 18 pages.

* cited by examiner

*Primary Examiner* — Harry K Liu
(74) *Attorney, Agent, or Firm* — Sawtooth Patent Group PLLC (57) ABSTRACT

This document describes techniques, apparatuses, and systems utilizing joint cost estimation for associating a detection-tracklet pair to an object. In aspects, a radar system generates a detection-tracklet pair that includes detection information about a detection for a radar reflection point in addition to tracklet information about a tracklet associated with the detection. Using the detection information and the tracklet information of the detection-tracklet pair, the radar system generates, for each potential data object of a plurality of potential data objects, a respective joint cost estimation and selects, based on the respective joint cost estimations, a data object from the plurality of potential data objects to associate with the detection-tracklet pair. The radar system then associates the detection-tracklet pair with the selected data object.

20 Claims, 5 Drawing Sheets

JOINT COST ESTIMATION FOR ASSOCIATING A DETECTION-TRACKLET PAIR TO AN OBJECT

BACKGROUND

Some devices use electromagnetic signals (e.g., radar) to detect and track objects. Identifying and tracking the objects may, however, involve multiple complex steps. To illustrate, a radar system may transmit radar signals towards an object and analyze reflected signals to determine information (e.g., a detection) about a corresponding reflection point off the object, at one moment in time, such as position and/or range rate information. The radar system uses multiple detections to generate a track for an identified object, which may consume large amounts of computing resources (e.g., memory storage, processing power). This can limit what functionality the radar system can provide. Thus, to increase functionality provided by the radar system, and to deliver reliable object detection and tracking, radar systems look for new approaches to detect and track objects in an efficient and accurate manner, while conserving the available processing resources for other tasks.

SUMMARY

This document describes techniques, apparatuses, and systems utilizing joint cost estimation for associating a detection-tracklet pair to an object. In aspects, a radar system generates a detection-tracklet pair that includes detection information about a detection for a radar reflection point in addition to tracklet information about a tracklet associated with the detection. Using the detection information and the tracklet information of the detection-tracklet pair, the radar system generates, for each potential data object of a plurality of potential data objects, a respective joint cost estimation and selects, based on the respective joint cost estimations, a data object from the plurality of potential data objects to associate with the detection-tracklet pair. The radar system then associates the detection-tracklet pair with the selected data object.

This Summary introduces simplified concepts related to joint cost estimation for associating a detection-tracklet pair to an object, which are further described below in the Detailed Description and Drawings. This Summary is not intended to identify essential features of the claimed subject matter, nor is it intended for use in determining the scope of the claimed subject matter.

BRIEF DESCRIPTION OF THE DRAWINGS

The details of techniques, apparatuses, and systems utilizing joint cost estimation for associating a detection-tracklet pair to an object are described in this document with reference to the following figures. The same numbers are often used throughout the drawings to reference like features and components.

DETAILED DESCRIPTION

Overview

Many industries use radar systems as sensing technology, including the automotive industry, to acquire information about the surrounding environment. To illustrate, a vehicle-based radar system uses radar signals to track objects surrounding the vehicle and identify potential safety hazards (e.g., an object approaching on a collision course with the vehicle, a lane departure). A radar emitter of the radar system, for example, transmits radar signals towards an object, and a tracker module of the radar system analyzes radar signals reflected off the object to identify instantaneous observations about a corresponding reflection point. In other words, the radar system analyzes the reflected radar signals and generates detections, where each detection includes detection information (e.g., an instantaneous observation), such as position and/or range rate information.

Using multiple detections obtained over time, the radar system may generate tracklets to improve the eventual detection and tracking of entire objects. A tracklet tracks individual reflection points on an object, rather than tracking the whole object, as is done with a track, and includes similar tracking information as a track to an entire object, including time-based information, such as lateral and/or longitudinal velocity of part of the object associate with the tracklet. A mature or coasted tracklet corresponds to a tracklet with history. For example, a mature or coasted tracklet corresponds to a tracklet generated in a previous detection cycle (e.g., previous frame) being updated with detection information from a current detection cycle (e.g., current frame). Conversely, a new tracklet corresponds to a newly generated tracklet with no prior history or updates.

A detection-tracklet pair corresponds to a detection and a tracklet that have an association. To illustrate, in a detection-tracklet pair, the tracklet information of the tracklet in the pair may be derived using detection information from the detection in the pair. When used to track observed objects, a detection-tracklet can provide more accuracy to the various states of an observed object, such as position, velocity, acceleration, heading, size estimations, and so forth, relative to detections alone. The various states of parts of an object can be isolated and when analyzed in combination, can indicate accurate object level estimates for the entire object based on the added details conveyed in the tracklets associated with those parts. This involves identifying which observed object corresponds to the detection and/or tracklet of the detection-tracklet pair. For example, assume that a radar system currently maintains and identifies fifteen observed objects. To track the fifteenth observed object, the radar system selects one of the fifteen observed objects as the object corresponding to the detection-tracklet pair, or determines to maintain a sixteenth, new observed object.

Matching the detections and tracklets to an observed object can consume large quantities of processing resources (e.g., memory, processing power) of the radar system, which can limit the functionality provided by the radar system. As one example, the radar system stores both detection information (e.g., position, range rate) associated with the detection and tracklet information (e.g., velocity) associated with the tracklet, some of which may be unnecessary, and consumes memory resources. To illustrate, a lateral and/or longitudinal velocity indicated by tracklet information provides more accuracy than a velocity in a range rate direction indicated by detection information, thus making the velocity in the range rate direction unnecessary and less accurate relative to the lateral and/or longitudinal velocity.

As another example, the radar system calculates a mathematical cost between a current detection and each observed object, which is also referred to as a detection-to-object cost. Assuming the radar system maintains fifteen observed objects, the radar system computes fifteen detection-to-object costs using the detection information of the current detection. Similarly, the radar system calculates a mathematical cost between a current tracklet and each observed object, also referred to as a tracklet-to-object cost, using the tracklet information of the current tracklet. This results in thirty separate calculations, some of which may be unnecessary, that consume processing resources of the radar system. Generally, the calculated mathematical cost, whether a detection-to-object cost or a tracklet-to-object cost, indicates a likelihood that the current detection or tracklet corresponds to the observed object. A lower cost indicates a higher likelihood of a correlation to the observed object In some aspects, the radar system associates a current detection to an observed object independently from associating a current tracklet to an observed object, which may lead to inaccuracies in the radar system. To illustrate, the independent selection of observed objects may result in the radar system associating the detection in a detection-tracklet pair to a first observed object, and the tracklet in the detection-tracklet pair to a second, different observed object. Unresolved, this can lead to inaccuracies when using the detection information or tracklet information to update the states of the respective observed objects. A misaligned selection of observed objects, for instance, can result in the radar system applying the detection information or tracklet information to the corresponding properties of an incorrect observed object. Therefore, to improve an accuracy when updating the states of an observed object, the radar system performs correction computations to resolve the misaligned selection of observed objects, which also consumes processing resources of the radar system. Thus, to increase functionality provided by the radar system, and to deliver reliable object detection and tracking, radar systems look for new approaches to efficiently, and accurately, associate a detection-tracklet pair to an observed object (and the corresponding properties) in a manner that conserves the available processing resources for other tasks.

This document describes techniques, apparatuses, and systems utilizing joint cost estimation for associating a detection-tracklet pair to an object, such as a data object (also referred to as an observed object). In aspects, a radar system generates a detection-tracklet pair that includes detection information about a detection for a radar reflection point in addition to tracklet information about a tracklet associated with the detection. Using the detection information and the tracklet information of the detection-tracklet pair, the radar system generates, for each potential data object of a plurality of potential data objects, a respective joint cost estimation. Based on the respective joint cost estimations, the radar system selects a data object from the plurality of potential data objects to associate with the detection-tracklet pair and associates the detection-tracklet pair with the selected data object. The radar system may output a track to the data object including information conveying properties of the entire data object, having details derived from the detection-tracklet pairs associated with the data object.

Using joint cost estimation reduces the amount of computing resources consumed by a radar system and improves an accuracy of the provided object tracking. To illustrate, joint cost estimation gates data objects before computing mathematical costs, which reduces an amount of processing performed by the radar system. Gating identifies data objects that are improbable for being associated to the detection-tracklet pair and eliminates computing the mathematical cost for the improbable data objects. Joint cost estimation also eliminates the potential of linking different data objects to a detection-tracklet pair, which eliminates the correction processing that resolves the misaligned data object selection, allows the radar system to purge the redundant or less accurate information of the detection-tracklet pair, and preserves processing resources and memory space.

Example System

Figure 1:
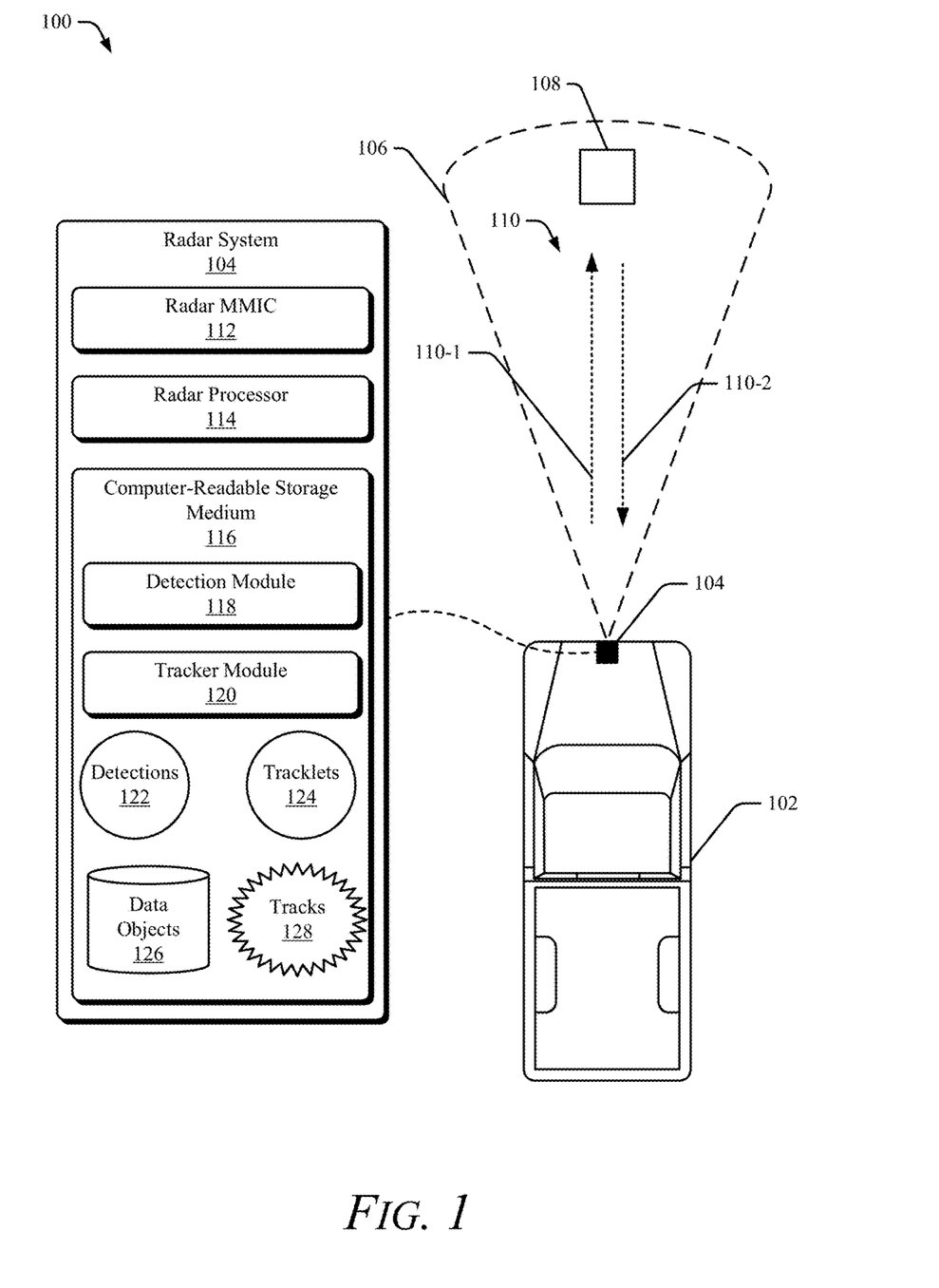
FIG. 1 illustrates an example system that implements joint cost estimation for associating a detection-tracklet pair to an object, in accordance with techniques, apparatuses, and systems of this disclosure.

FIG. 1 illustrates an example environment 100 in which joint cost estimation for associating a detection-tracklet pair to an object can be applied, in accordance with techniques of this disclosure. In the depicted environment 100, a vehicle 102 includes a radar system 104 that detects and/or tracks objects using radar signals. Based on detecting and/or tracking objects, the radar system 104 provides the vehicle 102 with information that enables advanced safety or autonomous driving features. While the environment 100 illustrates the vehicle 102 as a passenger car, other types of systems may include the radar system 104, such as other motorized vehicles (e.g., a truck, a motorcycle, a bus, a tractor, a semi-trailer truck), non-motorized vehicles (e.g., a bicycle), railed vehicles (e.g., a train), watercraft (e.g., a boat), aircraft (e.g., an airplane), spacecraft (e.g., satellite), or other types of moving or stationary platforms (e.g., machinery, robotic equipment).

In the environment 100, the vehicle 102 mounts the radar system at, or near, a front bumper, but the vehicle 102 may incorporate the radar system 104 in any alternate or additional locations, such as a back, top, bottom, or side portion of the vehicle 102, within a bumper, integrated into a side mirror, formed as part of a headlight and/or taillight, or at any other interior or exterior location suitable for object detection. The vehicle 102 may include multiple radar systems 104, such as a first radar system positioned at a front bumper (as shown in FIG. 1) and a second radar system positioned at a rear bumper (not shown in FIG. 1), where each radar system has a respective field of view (e.g., field of view 106) that corresponds to a region observable by the corresponding radar system at a given point in time.

The radar system 104 may configure the field of view 106 to have any suitable shape or size, such as by changing a variety of radar signal properties (e.g., carrier frequency, power), using different antenna sizes, and so forth. Accordingly, the field of view 106 may have a small size (e.g., 1 to 1.5 meters), an intermediate size (e.g., 1 to 30 meters), or a large size (e.g., greater than 30 meters). It is to be appreciated that these sizes are merely for discussion purposes, and that any other suitable range can be used. In some aspects, the radar system 104 configures the field of view 106 based on detecting a particular and/or an anticipated object (e.g., another vehicle, a pedestrian, a traffic sign, a barrier, an animal, debris). Alternatively, or additionally, the radar system 104 configures the field of view 106 based on location. To illustrate, the radar system 104 may configure the field of view 106 with a first size and/or shape for sensing approaching objects when positioned in front of the vehicle 102 and configure the field of view 106 with a second size and/or shape for sensing distancing objects when positioned behind the vehicle 102. The radar system 104 may also configure the field of view 106 based on a state-of-motion for the vehicle (e.g., stationary, moving at a speed less than thirty-five miles per hour, moving at a speed greater than thirty-file miles per hour). In the environment 100, the radar system 104 configures the field of view 106 for detecting objects positioned in front of the vehicle 102, such as object 108.

To detect and track the object 108, the radar system 104 emits and analyzes radar signals 110. To illustrate, the radar system emits a radar signal 110-1 towards the object 108 and analyzes a reflected radar signal 110-2 to determine properties about the object 108, such as a presence, a position, a lateral velocity, a longitudinal velocity, a range rate, and so forth. The radar system emits, via antenna elements, electromagnetic (EM) radiation (e.g., the radar signal 110-1) that has a direction of departure (DOD) and receives a reflection (e.g., the radar signal 110-2) that has a direction of arrival (DOA). The radar system 104 analyses the DOD and the DOA to generate information about the object 108 and provide information to the vehicle 102 that enables safe navigation at the vehicle 102, such as enabling automated navigation (e.g., driverless) that steers the vehicle around the object 108, providing audible and/or visual alerts that notify a manual driver about the object 108, semi-automated navigation that reduces a traveling velocity of the vehicle, and so forth.

In the environment 100, the radar system 104 includes a radar monolithic microwave integrated circuit (MMIC) 112 and a radar processor 114. While shown as separate components, the MMIC 112 and the radar processor 114 may alternatively be included within a single integrated circuit and/or system-on-chip (SoC). The MMIC 112 processes analog microwave and/or radar signals, which may include one or more of: signal mixing for up-conversion of an analog signal to radar frequencies, power amplification of the up-converted signal, and signal routing to an antenna (not shown in FIG. 1) for transmission (e.g., radar signal 110-1). Alternatively or additionally, the MMIC 112 receives a reflection (e.g., radar signal 110-2) by way of the antenna, down-converts the signal to an intermediate frequency (IF) signal, and routes the IF signal to other components (e.g., the radar processor 114) for further processing and analysis.

The radar processor 114 processes digital microwave and/or radar signals (e.g., the IF signal). This can include scheduling and configuring radar signal transmissions to create a field-of-view (e.g., the field of view 106) with a particular size, shape, and/or depth. The radar processor 114, for instance, generates digital representations of signal transmissions that are fed into a digital-to-analog converter (DAC) and upconverted to radar frequencies for transmission. In aspects, a DAC (not shown in FIG. 1) may be integrated with the MMIC 112, integrated with the radar processor 114 as part of an SoC, or be included in the radar system 104 as a stand-alone component. Alternatively or additionally, the radar processor 114 receives and processes a digitized version of a reflected radar signal by way of an analog-to-digital converter (ADC), such as a digitized IF signal generated by the MMIC 112 from the radar signal 110-2. In a similar manner to the DAC, an ADC may be integrated with the MMIC 112, integrated with the radar processor 114 as part of an SoC, or be included in the radar system 104 as a stand-alone component.

For clarity, the environment 100 shows the radar processor 114 as a single processor, but various implementations can include multiple processors. To illustrate, the radar processor 114 may include a signal processor (SP) and a data processor (DP) for different processing tasks. The SP, as one example, performs "low-level" processing, such as Fast Fourier Transforms (FFTs), identifying targets of interest for the DP, generating a range Doppler map, and so forth, while the DP performs "high-level" processing, such as tracking, display updates, user interface generation, and so forth. Here, the phrases "low-level" and "high-level" are used to denote a classification and/or partitioning of processing tasks that can be defined in a variety of ways (e.g., number of operations, time-sensitivity, quantity of data, complexity of operations).

The radar system also includes computer-readable storage media 116 (CRM 116), which may reside external to the radar processor 114 or be integrated with the radar processor 114 as part of an SoC. The CRM 116 represents any suitable memory or storage device (e.g., random-access memory (RAM), read-only memory (ROM), Flash memory) for storing processor-executable instructions and/or data. The CRM 116 as described herein excludes propagating signals.

The CRM 116 includes a detection module 118 and a tracker module 120 in the form of processor-executable instructions executable by the radar processor 114. However, the detection module 118 and/or the tracker module 120 may alternatively or additionally be implemented in whole or part as hardware logic or circuitry integrated with or separate from other components of the radar system 104. The CRM 116 also stores one or more detections 122, one or more tracklets 124, and one or more data objects 126. A data object refers to internal representations of objects identified and maintained by the tracker module 120, and can include a variety of properties, such as a track 128.

As further described, a detection corresponds to a point of reflection on an object at a single point in time and includes a variety of detection information that characterizes the point of reflection on the object, such as a range rate, a position, azimuth angle, and so forth. In aspects, the detection module 118 generates the one or more detections 122 by analyzing received radar signals as further described. The detection module 118 also generates the one or more tracklets 124 using detection information from two or more detections, which may include mature, coasted tracklets or new tracklets. For example, using at least two detection points, the detection module 118 derives tracklet information, such as lateral velocity and longitudinal velocity, that corresponds to intermediate information about a reflection point on an object and can be used to update properties of a data object (e.g., the tracks 128). Thus, while the detection information provided by a detection pertains to a single point in time, the tracklet information provided by a tracklet pertains to a span of time defined by at least two detections. A detection-tracklet pair corresponds to a detection and a tracklet that have an association (e.g., the radar system derives the tracklet in the pair using detection information from the detection in the pair).

The tracker module 120 associates a detection-tracklet pair with a respective data object of the one or more data objects 126, such as by using join cost estimation to select a particular data object out of a plurality of data objects as further described. In some aspects, the tracker module 120 updates properties of the data object using information from the detection-tracklet pair. For example, the tracker module updates the track 128 using information from the detection-tracklet pair. Generally, a track corresponds to an output from the tracker module that includes object-level information corresponding to an entire, radar-reflective object identified by the radar system (e.g., the object 108). Each track may have a structure including numerous fields containing various properties estimated for the identified object.

Joint Cost Estimation of a Detection-Tracklet Pair to an Object

Radar systems use radar signals to identify and observe objects by transmitting radar signals towards an object and analyzing radar signals reflected off the object to generate detections and tracklets (e.g., derived from multiple detections). A radar system may form a detection-tracklet pair and use information included in the detection-tracklet pair to update the properties of a corresponding data object. Selecting a data object to associate with the detection-tracklet pair, however, can consume large quantities of processing resources of the radar system, or lead to inaccuracies.

Figure 2:
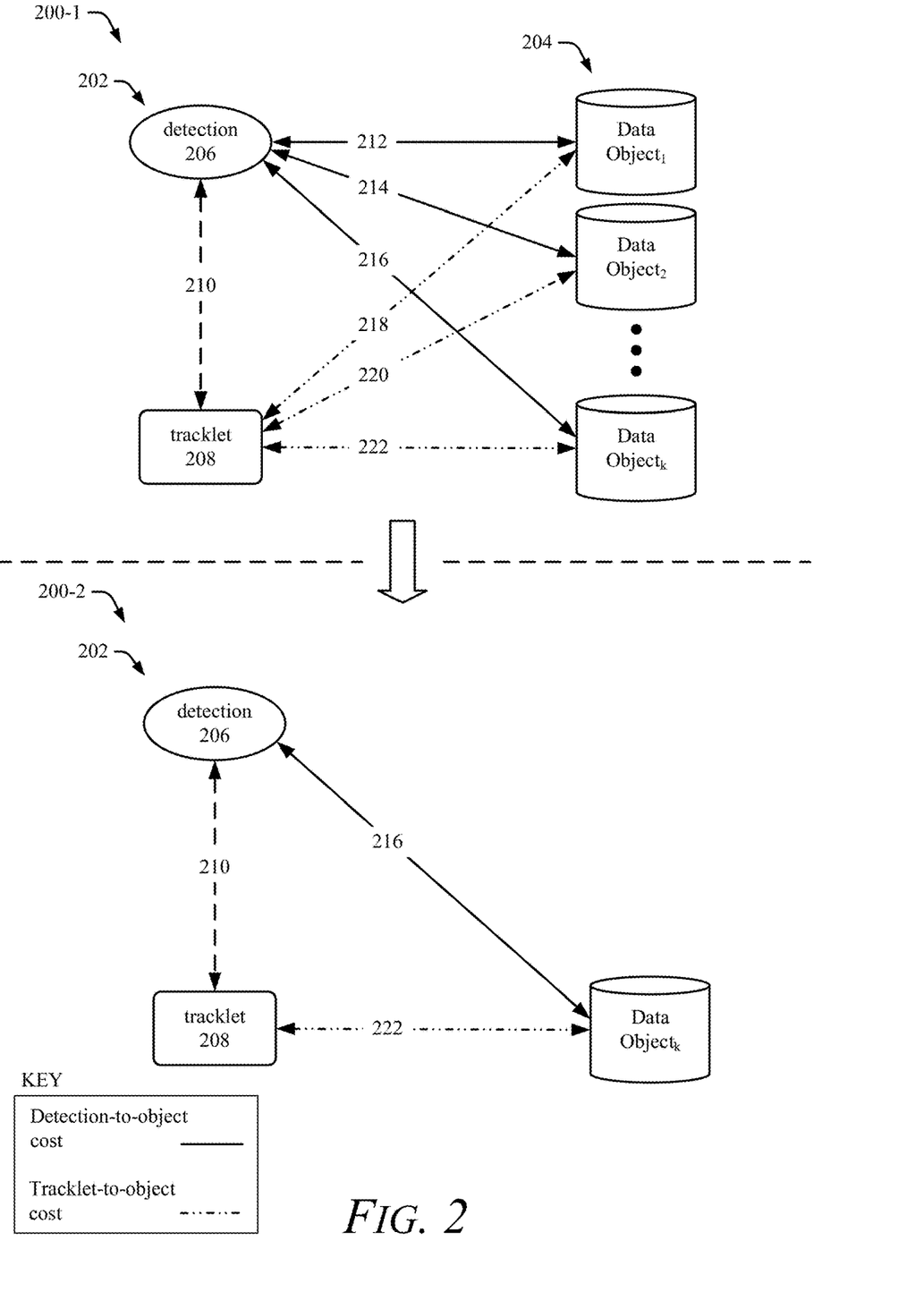
FIG. 2 illustrates an example process that assigns a data object to a detection independently from assigning a tracklet to a data object, where the detection and tracklet are included in a detection-tracklet pair.

FIG. 2 illustrates an example process 200 at different points in time, labeled as process 200-1 and process 200-2, respectively. The process 200 analyzes a detection-tracklet pair 202 together with multiple data objects 204 to assign the detection-tracklet pair 202 to a particular data object of the multiple data objects. The detection-tracklet pair 202 includes a detection 206 and a tracklet 208 with an association 210. As one example of an association, the radar system implementing the process 200 uses the detection information of the detection 206 to derive the tracklet 208 and/or tracklet information. The multiple data objects 204 include "k" data objects, where "k" represents an arbitrary number.

In the upper portion of FIG. 2, the process 200-1 generates, for each data object in the multiple data objects 204, a detection-to-object cost that indicates a relationship likelihood between the detection 206 and the respective data object. The process 200-1 uses, for example, the detection information of the detection 206 and properties of the respective data object to generate the detection-to-cost, such as by comparing detection position information with data object position information. In aspects, a detection-to-object cost (e.g., normalized) ranges between 0.0 and 1.0, where a value of 0.0 indicates a high likelihood of a relationship between the detection 206 and the respective data object and a value of 1.0 indicates a low likelihood of a relationship between the detection 206 and the respective data object. To illustrate, the process 200-1 generates a first detection-to-object cost 212 between the detection 206 and data object$_1$ of the multiple data objects 204, a second detection-to-object cost 214 between the detection 206 and data object$_2$ of the multiple data objects 204, and so forth, up to a k-th detection-to-object cost 216 between the detection 206 and data object$_k$ of the multiple data objects 204.

The process 200-1 also generates "k" tracklet-to-object costs that indicate a relationship likelihood between the tracklet 208 and each data object of the multiple data objects 204. The process 200-1, for example, generates a first tracklet-to-object cost 218 between the tracklet 208 and data object$_1$ of the multiple data objects 204, a second tracklet-to-object cost 220 between the tracklet 208 and data object$_2$ of the multiple data objects 204, and so forth, up to a k-th tracklet-to-object cost 222 between the tracklet 208 and the data object$_k$ of the multiple data objects 204. In a similar manner as generating the detection-to-object costs, the process 200-1 generates the tracklet-to-object costs using the tracklet information of the tracklet 208, such as by comparing a tracklet lateral velocity to a track lateral velocity of the data object.

In the lower portion of FIG. 2, the process 200-2 independently (i) selects a data object 204 to associate with the detection 206 and (ii) selects a data object 204 to associate with the tracklet 208. To illustrate, the process 200-2 analyzes the detection-to-object costs and selects the data object 204 with the lowest cost (and highest likelihood) relative to the other detection-to-object costs and/or associated data objects. In the FIG. 2, the process 200-2 determines to associate the data object$_k$ with the detection 206 based on the detection-to-object cost 216. In a similar manner, the process 200-2 analyzes the tracklet-to-object costs and selects the data object with the lowest cost (and highest likelihood) relative to the other tracklet-to-object costs and/or associated data objects. As shown in FIG. 2, the process 200-2 also, and independently, determines to associate the data object$_k$ with the tracklet 208 based on the tracklet-to-object cost 222.

The independent selection of data objects 204 to associate with the detection 206 and the tracklet 208 sometimes results in the process 200 selecting different data objects (not shown in FIG. 2). For instance, the process 200 may alternatively determine to associate the data object$_1$ with the detection 206 and the data object$_k$ with the tracklet 208, which can lead to inaccuracies when updating data object properties (e.g., the track 128) if one of the data objects is updated with the incorrect detection information or tracklet information. Further, while the process 200 can perform additional computations (also not shown in FIG. 2) to correct for the misaligned data object selection, these computations consume computing resources that could otherwise be reserved for other tasks. Generating detection-to-object costs and tracklet-to-object costs for each data object in the multiple data objects 204 also consumes the computing resources.

Figure 3:
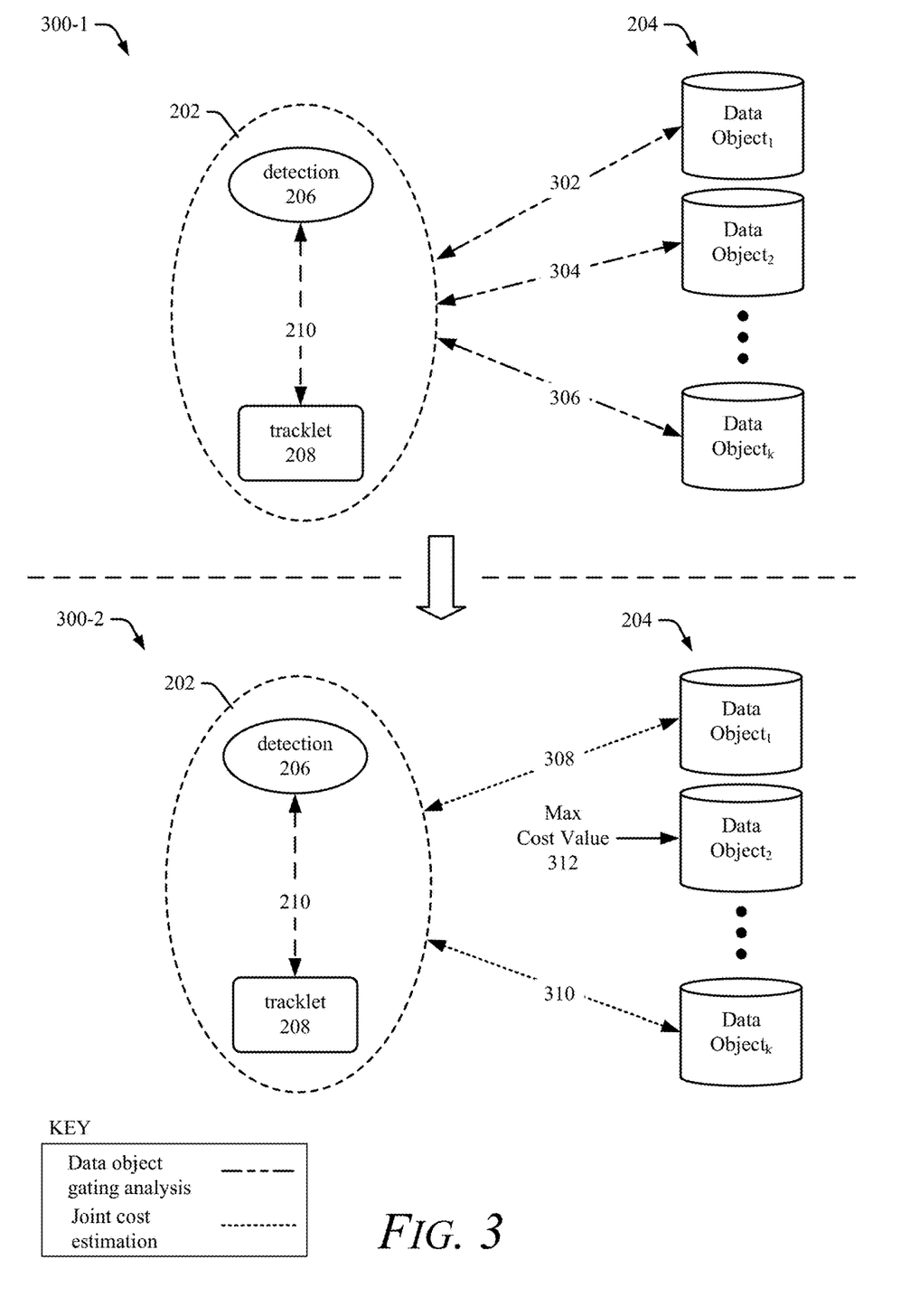
FIG. 3 illustrates an example process that assigns a data object to a detection-tracklet pair based on a joint cost estimation, in accordance with techniques, apparatuses, and systems of this disclosure.

FIG. 3 illustrates an example process 300 at different points in time, labeled as process 300-1 and process 300-2, respectively. In aspects, the process 300 is implemented by a radar system (e.g., the radar system 104) in accordance with techniques, apparatuses, and systems of this disclosure. The process 300 analyzes the detection-tracklet pair 202 and the multiple data objects 204 of FIG. 2 using joint cost estimation to select a particular data object to associate with the detection-tracklet pair 202. While described using a detection-tracklet pair, aspects of the process 300 may be performed using a single tracklet without an associated detection (e.g., a coasted and/or mature tracklet) or only using detection information when the tracklet in the detection-tracklet pair corresponds to a new tracklet.

In the upper portion of FIG. 3, the process 300-1 uses the detection information of the detection 206 and/or the tracklet information of the tracklet 208 to gate the data objects 204. In other words, the process 300-1 uses the detection information of the detection 206 and/or the tracklet information of the tracklet 208 to qualify each data object 204 as a potential data object to associate with the detection-tracklet pair 200. For example, and as further described with reference to FIG. 4, the gating process (i) identifies potential data objects 204 that are likely to be associated with the detection-tracklet 202 and performs a joint cost analysis on the potential data objects 204 and (ii) identifies data objects 204 unlikely to be associated with the detection-tracklet 202 and sets the joint cost estimation for these improbable data objects 204 to a maximum cost value (e.g., does not perform a joint cost analysis on the improbable data objects) that removes the improbable data objects 204 from consideration.

To illustrate, the process 300-1 performs a data object gating analysis on each data object in the multiple data objects 204, where the data object gating analysis can include multiple steps as further described (not shown in FIG. 3 for clarity). For example, the process 300-1 performs a first data object gating analysis 302 on the data object$_1$, a second data object gating analysis 304 for the data object$_2$, and so forth, through to a k-th data object gating analysis 306 for the data object$_k$. The data object gating analysis can include comparing tracklet information and/or detection information with data object properties of the respective data object In the lower portion of FIG. 3, the process 300-2 generates a joint cost estimation for each of the potential data objects identified by the process 300-1. The process 300-1, for example identified data object$_1$ and data object$_k$ as potential data objects, and data object$_2$ as an improbable data object. Accordingly, the process 300-2 generates a joint cost estimation 308 between the detection-tracklet pair 202 and the data object$_1$ using the detection information, tracklet information, and/or the data object properties of the data object$_1$. The process 300-2 also generates a joint cost estimation 310 between the detection-tracklet pair 202 and the data object$_k$ using the detection information, tracklet information, and/or the data object properties of the data object$_k$. For the data object$_2$, however, the data object gating analysis classified the data object$_2$ as an improbable object and, in response, process 300-2 sets a corresponding joint cost estimation to a maximum cost value 312 (max cost value 312). While FIG. 3 illustrates the process 300-1 performing a data object gating analysis on all data objects prior to the process 300-2 generating the joint cost estimations, these processes can be performed iteratively on a per-data object basis as described with reference to FIG. 4.

Figure 4:
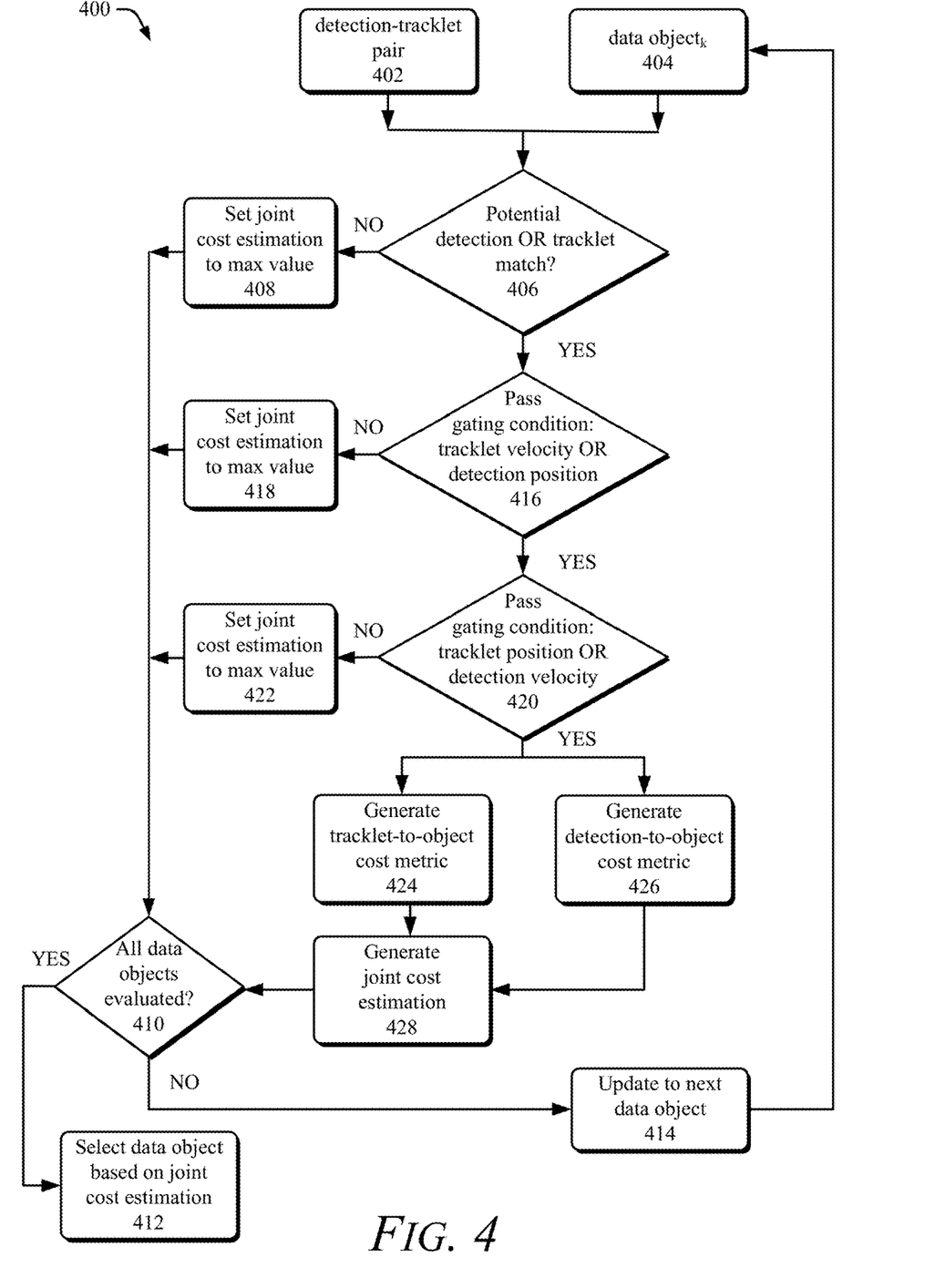
FIG. 4 illustrates an example flow diagram that can be used to associate a detection-tracklet pair to a data object using joint cost estimation, in accordance with techniques, apparatuses, and systems of this disclosure.

FIG. 4 illustrates an example flow diagram 400 that can be implemented as a process to associate a detection-tracklet pair to a data object using joint cost estimation, in accordance with techniques, apparatuses, and systems of this disclosure. In aspects, the flow diagram 400 may be implemented by a computing device, such as the radar system 104 of FIG. 1. While described with reference to analyzing a detection-tracklet pair, aspects of the flow diagram 400 can be performed using only tracklet information (e.g., from a mature or coasted tracklet) or using only detection information (e.g., a detection-tracklet pair with a new tracklet).

In some implementations, the flow diagram 400 receives a detection-tracklet pair 402 and a respective data object$_k$ 404 as input, where the data object$_k$ corresponds to one of multiple data objects. As a first gating condition, at 406 of the flow diagram 400, a computing device (e.g., the radar system 104) determines whether the detection and/or tracklet are valid for the data object$_k$ 404. To illustrate, using the detection information, the computing device determines whether the detection corresponds to a multibounce and/or corresponds to a weak detection based on surroundings. If the computing device determines the detection corresponds to a multibounce or a weak condition, the computing device flags the detection as invalid, such as by setting a Boolean flag to false. In some aspects, the computing device determines a validity of the detection based on an age property of the data object$_k$ 404. Alternatively or additionally, the computing device determines a validity of the tracklet relative to the data object$_k$ 404 using the tracklet information. As one example, the computing device compares a first motion class of the tracklet to a second motion class of the data object$_k$ 404, and determines the tracklet is valid for the data object$_k$ 404 if the two have common motion classes. The computing device alternatively determines the tracklet is invalid for the data object$_k$ 404 if the two have differing motion classes. As another example, assume that the tracklet of the detection-tracklet pair 402 updates for each detection cycle of the radar system 104. If the tracklet of the detection-tracklet pair 402 has been matched to the data object$_k$ 404 in a previous detection cycle, then the computing device determines the tracklet is valid for data object$_k$ 404.

If the computing device determines that the detection and the tracklet of the detection-tracklet pair 402 are both invalid, or only the tracklet is invalid for implementations that do not use a detection-tracklet pair, execution of the process of the flow diagram 400 follows the path labeled "NO" and, at 408, the computing device sets a joint cost estimation for the detection-tracklet pair 402 and the data object$_k$ 404 to a maximum value (e.g., 1.0). Execution of the process of the flow diagram 400 then proceeds to 410 where the computing device determines whether all data objects known to the computing device have been analyzed in conjunction with the detection-tracklet pair 402. If the computing device determines that all known data objects have been evaluated, the flow diagram follows the path labeled "YES" and proceeds to 412, where the computing device selects a data object based on the joint cost estimations as further described below. This may include creating a new data object if none of the known data objects satisfy the gating conditions. Conversely, if the computing device determines that more known data objects need to be evaluated, the flow diagram follows the path labeled "NO" and proceeds to 414, where the computing device updates the input to the flow diagram to a next known data object and evaluates the next known data object with the gating conditions as further described.

Returning to the first gating condition as described at 406, if the computing device determines that at least one of the detection and tracklet of the detection-tracklet pair is valid, the flow diagram follows the path labeled "YES" and the computing device determines whether the detection-tracklet pair passes a second gating condition at 416. As part of the second gating condition, the computing device analyzes the tracklet information of the tracklet to determine whether a tracklet velocity of the tracklet falls within a velocity threshold of a track velocity (e.g., indicated by properties of the track 128) of the data object$_k$ 404. If the tracklet velocity falls within the velocity threshold, the computing device determines that the tracklet-detection pair 402 passes the second gating condition. Alternatively or additionally, as part of the second gating condition, the computing device analyzes the detection information to determine whether a detection position of the detection falls within a position threshold of a position of the data object$_k$ 404, where the detection position of the detection falling within the position threshold passes the second gating condition and falling outside the position threshold fails the second gating condition. Thus, the computing can determine, based on the track velocity and/or position of the data object$_k$ 404, that the detection-tracklet pair 402 passes the second gating condition based on determining the tracklet velocity falls within the velocity threshold or the detection position falls within the position threshold. For implementations that utilize only tracklet information or only detection information, the second gating condition evaluates only those sets of information.

Generally, the tracklet velocity of a tracklet provides more accuracy than a velocity in a range rate direction for a detection. Similarly, the detection position of the detection provides more accuracy relative to a tracklet position for the tracklet. Using the more accurate representations (e.g., the tracklet velocity, the detection position) as part of the second gating conditions quickly identifies improbable data objects and eliminates the need to compute further gating conditions and/or joint cost estimations. Thus, the positioning of these gating conditions in the flow diagram 400 preserves computing resources of the computing device.

In response to determining that the tracklet velocity falls outside of the velocity threshold to the track velocity of the data object$_k$ 404 and that the detection position falls outside of the position threshold to the position of the data object$_k$ 404, execution of the flow diagram 400 follows the path labeled "NO", and, at 418, the computing device sets a joint cost estimation for the detection-tracklet pair 402 and the data object$_k$ 404 to a maximum value (e.g., 1.0). In a similar manner as described at 408, execution of the flow diagram 400 then proceeds to 410 where the computing device determines whether all known data objects have been analyzed in conjunction with the detection-tracklet pair 402, updates to a next object at 414 or selects a data object based on the joint cost estimations at 412.

Returning to the second gating condition as described at 416, if the computing device determines that the tracklet velocity falls inside of the velocity threshold to the track velocity of the data object$_k$ 404 or that the detection position falls inside of the position threshold to the position of the data object$_k$ 404, the flow diagram 400 in execution follows the path labeled "YES" and the computing device determines whether the detection-tracklet pair passes a third gating condition at 420. As part of the third gating condition, the computing device analyzes the tracklet information of the tracklet to determine whether a tracklet position of the tracklet falls within the position threshold of the position of the data object$_k$ 404. Alternatively or additionally, as part of the third gating condition, the computing device analyzes the detection information to determine whether a detection velocity of the detection falls within the velocity threshold of the track velocity of the data object$_k$ 404.

In some aspects, the flow diagram synchronizes the second and third gating conditions such that if the second gating condition validates the tracklet velocity at 416, the third gating condition validates the tracklet position at 420. In other words, if the second gating condition validates the tracklet velocity at 416, then the third gating condition only validates the tracklet position at 420 and does not validate the detection velocity at 420. Alternatively, if the second gating condition validates the detection position at 416, the third gating condition validates only the detection velocity at 420 (and does not validate the tracklet position). Thus, the passing or failing of a gating condition may only include validating the tracklet using tracklet information or validating the detection using detection information. As one example, for coasted and/or mature tracklets without a paired detection, the computing device only utilizes the tracklet information for evaluating the second and third gating conditions at 416 and 420. As another example, for new tracklets (e.g., not linked to prior tracklets of earlier detection cycles), the computing device only utilizes the detection information evaluating the second and third gating conditions at 416 and 420.

If the computing device determines that the tracklet position and the detection velocity do not pass the third gating condition at 420, execution of the flow diagram 400 follows the path labeled "NO" and, at 422, the computing device sets a joint cost estimation for the detection-tracklet pair 402 and the data object$_k$ 404 to a maximum value (e.g., 1.0). In a similar manner as described at 408 and at 418, the flow diagram then proceeds to 410, where the computing device determines whether all known data objects have been analyzed in conjunction with the detection-tracklet pair 402, updates to a next object at 414 or selects a data object based on the joint cost estimations at 412.

Returning to the third gating conditions as described at 420, if the computing device determines that the tracklet position falls inside of the position threshold to the track position of the data object$_k$ 404 or that the detection velocity falls inside of the velocity threshold to the track velocity of the data object$_k$ 404, execution of the flow diagram 400 follows the path labeled "YES", where the computing device generates a tracklet-to-object cost at 424 and/or generates a detection-to-object cost at 426. To illustrate, the computing device computes the tracklet-to-object cost based on a normalized weighted sum of the absolute difference between a lateral velocity of the tracklet in the detection-tracklet pair 402 and the data object$_k$ 404 (e.g., by way of the track 128), a longitudinal velocity of the tracklet in the detection-tracklet pair 402 and the data object$_k$ 404, a lateral position of the tracklet in the detection-tracklet pair 402 and the data object$_k$ 404, and/or a longitudinal position of the tracklet in the detection-tracklet pair 402. Alternatively or additionally, the computing device generates the detection-to-object cost based on a normalized Euclidean distance between a detection position indicated by the detection information and a center-of-body position of the data object$_k$ 404 (e.g., by way of the track 128). However, in some aspects, the computing device may only compute the tracklet-to-object costs (e.g., for coasted tracklets), while in other aspects, the computing device may only compute the detection-to-object cost (e.g., for detection-tracklet pairs that include new tracklets)

In response to generating the tracklet-to-object cost and/or the detection-to-object cost, the computing device generates a joint cost estimation at 428. For example, in generating both the tracklet-to-object cost and the detection-to-object cost, the computing device generates the joint cost estimation as a weighted average of the tracklet-to-object cost and the detection-to-object cost. As another example, the computing device may use the detection-to-object cost as the joint cost estimation, such as for new tracklets. In some implementations, the computing device uses the tracklet-to-object cost as the joint cost estimation, such as for coasted tracklets with no paired detection.

The flow diagram 400, when implemented, then proceeds as shown at 410, where the computing device determines whether all known data objects have been evaluated. If the computing device determines that more known data objects need to be evaluated, the flow diagram follows the path labeled "NO" and proceeds to 414, where the computing device updates the input to the flow diagram to a next known data object and evaluates the next known data object with the gating conditions as further described.

If the computing device determines that all known data objects have been evaluated, the flow diagram 400 follows the path labeled "YES" and proceeds to 412, where the computing device selects a data object based on the joint cost estimations. For example, the computing device selects a data object associated with the lowest joint cost estimation out of multiple joint cost estimations iteratively generated by execution of the process laid out in the flow diagram 400 and associates the detection-tracklet pair 402 to the selected data object. In associating the detection-tracklet pair to the selected data object, the computing device may delete or purge redundant or less accurate information of the combined detection information and tracklet information to free up memory resources for other tasks. As another example, the computing device generates a new data object (with a new track property) when none of the joint cost estimations meet a performance threshold (e.g., less than the performance threshold).

Gating a detection-tracklet pair, a detection paired to a new tracklet, and/or a coasted tracklet using data object properties (e.g., track properties) reduces the amount of computing resources consumed by a radar system. For example, gating identifies improbable data objects and eliminates generating joint cost estimation for the improbable data objects, thus reducing an amount of processing performed by the radar system. Generating a joint cost estimation also eliminates the potential of linking different data objects to a detection-tracklet pair, which eliminates correction processing performed to resolve the different data objects and allows the radar system to purge or delete redundant or less accurate information as further described. In turn, this improves the operation of the radar system by preserving these computing resources for other tasks.

Example Method

Figure 5:
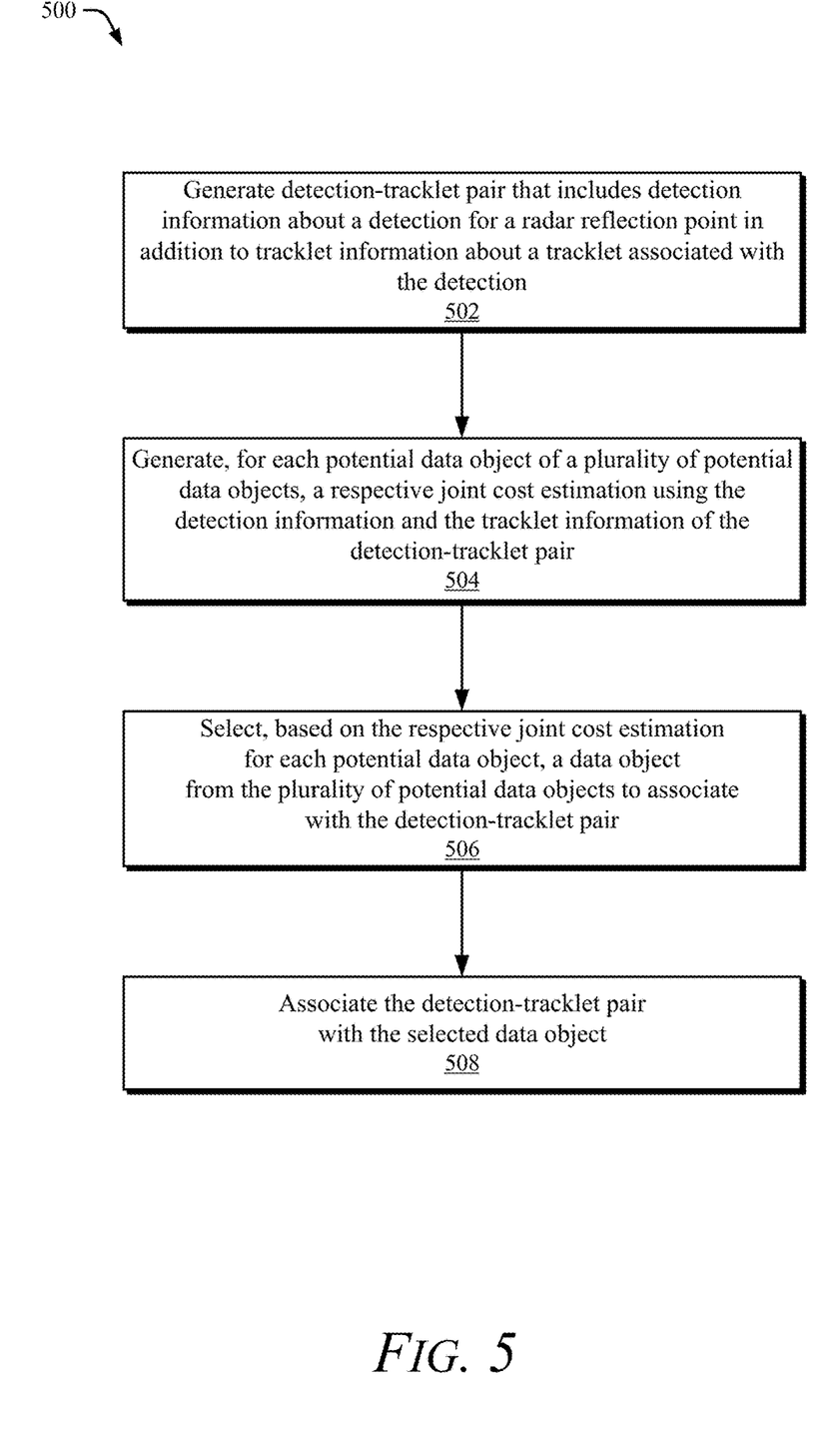
FIG. 5 illustrates an example method for utilizing joint cost estimation for associating a detection-tracklet pair to an object, in accordance with techniques, apparatuses, and systems of this disclosure.

FIG. 5 illustrates an example method 500 that implements aspects of joint cost estimation for associating a detection-tracklet pair to an object in accordance with techniques, apparatuses, and systems of this disclosure. The example method 500 may be implemented in any of the previously described environments, by any of the previous systems or components, and utilizing any of the previously described techniques. For example, the example method 500 can be implemented by the radar system 104 of FIG. 1 using aspects as described by the process 300 and/or the flow diagram 400. However, the example method 500 may also be implemented in other environments, by other systems or components, and using other techniques. Operations 502 through 508 may be performed by one or more entities (e.g., the radar MMIC 112, the radar processor 114, the detection module 118, the tracker module 120). The order in which the operations are shown and/or described is not intended to be construed as a limitation, and the order may be rearranged without departing from the scope of this disclosure. Furthermore, any number of the operations can be combined with any other number of the operations to implement the example method or an alternate method.

At 502, a radar system generates, using a radar sensor, a detection-tracklet pair that includes detection information about a detection for a radar reflection point in addition to tracklet information about a tracklet associated with the detection. For example, as described with reference to FIG. 1, the radar system 104 transmits radar signals 110-1 towards and object and analyzes reflected radar signals 110-2 to generate detections and/or tracklets. In some aspects, the radar system 104 associates detections with tracklets to create a detection-tracklet pair, which can include mature tracklets based on previous detection cycles or new tracklets without an association to a tracklet from an earlier detection cycle. However, the radar system 104 may alternatively or additionally generate coasted tracklets not included in a detection-tracklet pair.

At 504, the radar system generates, for each potential data object of a plurality of potential data objects, a respective joint cost estimation using the detection information and the tracklet information of the detection-tracklet pair. For example, the radar system 104 generates a plurality of joint cost estimations using the flow diagram 400 to gate data objects. This can include using the detection information and/or the tracklet information to determine when to gate the data objects and/or set the joint cost estimation to a maximum value. In some aspects, however, the radar system 104 generates a respective joint cost estimation using detection information and/or tracklet information as further described with reference to FIGS. 3 and 4.

At 506, the radar system selects, based on the respective joint cost estimations for the potential data objects, a data object from the plurality of potential data objects to associate with the detection-tracklet pair. To illustrate, the radar system 104 selects a data object from the plurality of potential data objects that has the lowest joint cost estimation relative to the other potential data objects in the plurality as further described with reference to FIGS. 3 and 4.

At 508, the radar system associates the detection-tracklet pair with the selected data object. For example, the radar system 104 uses the detection information and/or the tracklet information of the detection-tracklet pair to update a track (e.g., the track 128) of the selected data object.

Examples Section

In the following section, additional examples of joint cost estimation for associating a detection-tracklet pair to an object are provided.

Example 1: A method comprising: generating, using a radar sensor, a detection-tracklet pair that includes detection information about a detection for a radar reflection point in addition to tracklet information about a tracklet associated with the detection; generating, for each potential data object of a plurality of potential data objects, a respective joint cost estimation using the detection information and the tracklet information of the detection-tracklet pair; selecting, based on the respective joint cost estimations for the plurality of potential data objects, a data object from the plurality of potential data objects to associate with the detection-tracklet pair; and associating the detection-tracklet pair with the selected data object.

Example 2: The method as recited in any preceding example, wherein generating the respective joint cost estimation further comprises: for each of the plurality of potential data objects: determining, as a first gating condition and using the detection information or the tracklet information, whether the detection is valid for the potential data object or whether the tracklet is valid for the potential data object; and in response to determining that the detection or the tracklet are valid for the potential data object, validating one or more additional gating conditions using the detection information or the tracklet information.

Example 3: The method as recited in any preceding example, wherein determining whether the detection is valid for the potential data object further comprises: determining whether the detection is valid for the potential data object based on at least one of: determining whether the detection is a multibounce detection; determining whether the detection is a weak detection; or an age of the potential data object.

Example 4: The method as recited in any preceding example, wherein determining whether the tracklet is valid for the potential data object further comprises: determining whether the tracklet is valid for the potential data object based on at least one of: a similarity between a first motion class of the tracklet and a second motion class of the potential data object; or a prior matching between the tracklet and the potential data object.

Example 5: The method as recited in any preceding example, wherein validating the one or more additional gating conditions further comprises: determining, using the detection information, whether a detection position of the detection is within a position threshold to a data object position associated with the potential data object; or determining, using the tracklet information, whether a tracklet velocity of the tracklet is within a velocity threshold to a data object velocity associated with the potential data object.

Example 6: The method as recited in any preceding example, wherein validating the one or more additional gating conditions further comprises: determining the detection position of the detection is outside the position threshold to the data object position associated with the potential data object; determining the tracklet velocity of the tracklet is outside the velocity threshold to the data object velocity associated with the potential data object; and setting the respective joint cost estimation to a maximum value.

Example 7: The method as recited in any preceding example, wherein validating the one or more additional gating conditions further comprises: in response to determining the detection position of the detection is within the position threshold to the data object position associated with the potential data object or the tracklet velocity of the tracklet is within the velocity threshold to the data object velocity associated with the potential data object: determining, using the detection information, whether a detection velocity of the detection is within the velocity threshold to the data object velocity of the potential data object; or determining, using the tracklet information, whether a tracklet position of the tracklet is within the position threshold to the data object position associated with the potential data object.

Example 8: The method as recited in any preceding example, wherein validating the one or more additional gating conditions further comprises: determining the detection velocity of the detection is outside of the velocity threshold to the data object velocity of the potential data object; determining the tracklet position of the tracklet is outside of the position threshold to the data object position of the potential data object; and setting the respective joint cost estimation to a maximum value.

Example 9: The method as recited in any preceding example, further comprising: in response to determining the detection velocity of the detection is within the velocity threshold to the data object velocity of the potential data object or determining the tracklet position of the tracklet is within the position threshold to the data object position of the potential data object: calculating the respective joint cost estimation using the detection information or the tracklet information.

Example 10: The method as recited in any preceding example, wherein calculating the respective joint cost estimation further comprises: computing, using the tracklet information of the tracklet and track information associated with the potential data object, a tracklet-to-object cost between the tracklet and the potential data object; computing, using the detection information and the track information associated with the potential data object, a detection-to-object cost between the detection and the potential data object; and generating the respective joint cost estimation using the tracklet-to-object cost and the detection-to-object cost.

Example 11: The method as recited in any preceding example, wherein computing the tracklet-to-object cost comprises: computing the tracklet-to-object cost based on a normalized weighted sum of an absolute different between at least one of: a first lateral velocity associated with the tracklet and a second lateral velocity associated with the potential data object; a first longitudinal velocity associated with the tracklet and a second longitudinal velocity associated with the potential data object; a first lateral position associated with the tracklet and a second lateral position associated with the potential data object; or a first longitudinal position associated with the tracklet and a second longitudinal position associated with the potential data object.

Example 12: The method as recited in any preceding example, wherein computing the detection-to-object cost comprises: computing the detection-to-object cost based on a Euclidean distance between a detection position of the detection and a center-of-body position of the potential data object.

Example 13: The method as recited in any preceding example, wherein selecting the data object from the plurality of potential data objects further comprises: selecting, as the data object, a potential data object from the plurality of potential data objects that has a lowest joint cost estimation relative to other potential data objects in the plurality of potential data objects.

Example 14: The method as recited in any preceding example, wherein generating the respective joint cost estimation using the tracklet-to-object cost and the detection-to-object cost further comprises: computing the respective joint cost estimation as a weighted average of the detection-to-object cost and the tracklet-to-object cost.

Example 15: A radar system comprising: a monolithic microwave integrated circuit (MMIC); and a radar processor that operate in concert to direct the radar system to perform operations comprising: generate, using the MMIC and radar processor, a detection-tracklet pair that includes detection information about a detection for a radar reflection point in addition to tracklet information about a tracklet associated with the detection; generate, for each potential data object of a plurality of potential data objects, a respective joint cost estimation using the detection information and the tracklet information of the detection-tracklet pair; select, based on the respective joint cost estimations for the potential data objects, a data object from the plurality of potential data objects to associate with the detection-tracklet pair; and associate the detection-tracklet pair with the selected data object.

Example 16: The radar system as recited in any preceding example, wherein the operations to generate the respective joint cost estimation further comprise operations to: for each of the plurality of potential data objects: determine, as a first gating condition and using the detection information or the tracklet information, whether the detection is valid for the potential data object or whether the tracklet is valid for the potential data object; and in response to determining that the detection or the tracklet are valid for the potential data object, validate one or more additional gating conditions using the detection information or the tracklet information.

Example 17: The radar system as recited in any preceding example, wherein the operations to validate the one or more additional gating conditions further comprise operations to: determine, using the detection information, whether a detection position of the detection is within a position threshold to a data object position associated with the potential data object; or determine, using the tracklet information, whether a tracklet velocity of the tracklet is within a velocity threshold to a data object velocity associated with the potential data object.

Example 18: The radar system as recited in any preceding example, wherein the operations to validate the one or more additional gating conditions further comprise operations to: determine the detection position of the detection is outside the position threshold to the data object position associated with the potential data object; determine the tracklet velocity of the tracklet is outside the velocity threshold to the data object velocity associated with the potential data object; and set the respective joint cost estimation to a maximum value.

Example 19: The radar system as recited in any preceding example, wherein the operations to validate the one or more additional gating conditions further comprise operations to: in response to determining the detection position of the detection is within the position threshold to the data object position associated with the potential data object or the tracklet velocity of the tracklet is within the velocity threshold to the data object velocity associated with the potential data object: determine, using the detection information, whether a detection velocity of the detection is within the velocity threshold to the data object velocity of the potential data object; or determine, using the tracklet information, whether a tracklet position of the tracklet is within the position threshold to the data object position associated with the potential data object.

Example 20: The radar system as recited in any preceding example, wherein the radar system performs further operations to: in response to determining the detection velocity of the detection is within the velocity threshold to the data object velocity of the potential data object or determining the tracklet position of the tracklet is within the position threshold to the data object position of the potential data object: calculating the respective joint cost estimation using the detection information or the tracklet information; and select, as the data object from the plurality of potential data objects, a potential data object has a lowest joint cost estimation relative to other potential data objects in the plurality of potential data objects.

Example 21: A system comprising means for performing the method of any preceding example.

Example 22: A computer-readable storage medium comprising instructions that, when executed, configured a processor to perform the method of any preceding example.

Example 23: A radar system comprising at least one processor configured to perform the method of any preceding example.

CONCLUSION

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the spirit and scope of the disclosure as defined by the following claims.

The use of "or" and grammatically related terms indicates non-exclusive alternatives without limitation unless the context clearly dictates otherwise. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

What is claimed is:

1. A method comprising:
    generating, using a radar sensor, detection-tracklet pairs that include detection information about detections for radar reflection points representing parts of objects in addition to tracklet information about tracklets associated with respective detections, the tracklets tracking the radar reflection points;
    generating, for each potential data object of a plurality of potential data objects, a respective joint cost estimation using information and the tracklet information of each detection-tracklet pair;
    selecting, based on the respective joint cost estimations for the plurality of potential data objects, a respective data object from the plurality of potential data objects to associate with each detection-tracklet pair;
    analyzing a plurality of detection-tracklet pairs associated with one of the data objects to determine object level estimates of states of the data object; and
    tracking the data object based on the analysis of the detection-tracklet pairs associated with the data object.

2. The method as recited in claim 1, wherein generating the respective joint cost estimation further comprises:
    for each of the plurality of potential data objects:
        determining, as a first gating condition and using the detection information or the tracklet information of each detection-tracklet pair, whether the detection is valid for the potential data object or whether the tracklet is valid for the potential data object; and
        in response to determining that the detection or the tracklet are valid for the potential data object, validating one or more additional gating conditions using the detection information or the tracklet information.

3. The method as recited in claim 2, wherein determining whether the detection is valid for the potential data object further comprises:
    determining whether the detection is valid for the potential data object based on at least one of:
        determining whether the detection is a multibounce detection;
        determining whether the detection is a weak detection; or
        an age of the potential data object.

4. The method as recited in claim 2, wherein determining whether the tracklet is valid for the potential data object further comprises:
    determining whether the tracklet is valid for the potential data object based on at least one of:
        a similarity between a first motion class of the tracklet and a second motion class of the potential data object; or
        a prior matching between the tracklet and the potential data object.

5. The method as recited in claim 2, wherein validating the one or more additional gating conditions further comprises:
    determining, using the detection information, whether a detection position of the detection is within a position threshold to a data object position associated with the potential data object; or
    determining, using the tracklet information, whether a tracklet velocity of the tracklet is within a velocity threshold to a data object velocity associated with the potential data object.

6. The method as recited in claim 5, wherein validating the one or more additional gating conditions further comprises:
   determining the detection position of the detection is outside the position threshold to the data object position associated with the potential data object;
   determining the tracklet velocity of the tracklet is outside the velocity threshold to the data object velocity associated with the potential data object; and
   setting the respective joint cost estimation to a maximum value.

7. The method as recited in claim 5, wherein validating the one or more additional gating conditions further comprises:
   in response to determining the detection position of the detection is within the position threshold to the data object position associated with the potential data object or the tracklet velocity of the tracklet is within the velocity threshold to the data object velocity associated with the potential data object:
      determining, using the detection information, whether a detection velocity of the detection is within the velocity threshold to the data object velocity of the potential data object; or
      determining, using the tracklet information, whether a tracklet position of the tracklet is within the position threshold to the data object position associated with the potential data object.

8. The method as recited in claim 7, wherein validating the one or more additional gating conditions further comprises:
   determining the detection velocity of the detection is outside of the velocity threshold to the data object velocity of the potential data object;
   determining the tracklet position of the tracklet is outside of the position threshold to the data object position of the potential data object; and
   setting the respective joint cost estimation to a maximum value.

9. The method as recited in claim 7, further comprising:
   in response to determining the detection velocity of the detection is within the velocity threshold to the data object velocity of the potential data object or determining the tracklet position of the tracklet is within the position threshold to the data object position of the potential data object:
      calculating the respective joint cost estimation using the detection information or the tracklet information.

10. The method as recited in claim 9, wherein calculating the respective joint cost estimation further comprises:
    computing, using the tracklet information of the tracklet and track information associated with the potential data object, a tracklet-to-object cost between the tracklet and the potential data object;
    computing, using the detection information and the track information associated with the potential data object, a detection-to-object cost between the detection and the potential data object; and
    generating the respective joint cost estimation using the tracklet-to-object cost and the detection-to-object cost.

11. The method as recited in claim 10, wherein computing the tracklet-to-object cost comprises:
    computing the tracklet-to-object cost based on a normalized weighted sum of an absolute different between at least one of:
       a first lateral velocity associated with the tracklet and a second lateral velocity associated with the potential data object;
       a first longitudinal velocity associated with the tracklet and a second longitudinal velocity associated with the potential data object;
       a first lateral position associated with the tracklet and a second lateral position associated with the potential data object; or
       a first longitudinal position associated with the tracklet and a second longitudinal position associated with the potential data object.

12. The method as recited in claim 11, wherein computing the detection-to-object cost comprises:
    computing the detection-to-object cost based on a Euclidean distance between a detection position of the detection and a center-of-body position of the potential data object.

13. The method as recited in claim 10, wherein selecting the data object from the plurality of potential data objects further comprises:
    selecting, as the data object, a potential data object from the plurality of potential data objects that has a lowest joint cost estimation relative to other potential data objects in the plurality of potential data objects.

14. The method as recited in claim 11, wherein generating the respective joint cost estimation using the tracklet-to-object cost and the detection-to-object cost further comprises:
    computing the respective joint cost estimation as a weighted average of the detection-to-object cost and the tracklet-to-object cost.

15. A radar system comprising:
    a monolithic microwave integrated circuit (MMIC); and
    a radar processor that operates in concert to direct the radar system to perform operations comprising:
       generate, using the MMIC and radar processor, detection-tracklet pairs that include detection information about detections for radar reflection points representing parts of objects in addition to tracklet information about tracklets associated with respective detections, the tracklets tracking the radar reflection points;
       generate, for each potential data object of a plurality of potential data objects, a respective joint cost estimation using the detection information and the tracklet information of each detection-tracklet pair;
       select, based on the respective joint cost estimations for the potential data objects, a respective data object from the plurality of potential data objects to associate with each detection-tracklet pair;
       analyze a plurality of detection-tracklet pairs associated with one of the data objects to determine object level estimates of states of the data object; and
       track the data object based on the analysis of the detection-tracklet pairs associated with the data object.

16. The radar system as recited in claim 15, wherein the operations to generate the respective joint cost estimation further comprise operations to:
    for each of the plurality of potential data objects:
       determine, as a first gating condition and using the detection information or the tracklet information of each detection-tracklet pair, whether the detection is valid for the potential data object or whether the tracklet is valid for the potential data object; and in response to determining that the detection or the tracklet are valid for the potential data object, validate one or more additional gating conditions using the detection information or the tracklet information.

17. The radar system as recited in claim 16, wherein the operations to validate the one or more additional gating conditions further comprise operations to:
   determine, using the detection information, whether a detection position of the detection is within a position threshold to a data object position associated with the potential data object; or
   determine, using the tracklet information, whether a tracklet velocity of the tracklet is within a velocity threshold to a data object velocity associated with the potential data object.

18. The radar system as recited in claim 17, wherein the operations to validate the one or more additional gating conditions further comprise operations to:
   determine the detection position of the detection is outside the position threshold to the data object position associated with the potential data object;
   determine the tracklet velocity of the tracklet is outside the velocity threshold to the data object velocity associated with the potential data object; and
   set the respective joint cost estimation to a maximum value.

19. The radar system as recited in claim 17, wherein the operations to validate the one or more additional gating conditions further comprise operations to:
   in response to determining the detection position of the detection is within the position threshold to the data object position associated with the potential data object or the tracklet velocity of the tracklet is within the velocity threshold to the data object velocity associated with the potential data object:
      determine, using the detection information, whether a detection velocity of the detection is within the velocity threshold to the data object velocity of the potential data object; or
      determine, using the tracklet information, whether a tracklet position of the tracklet is within the position threshold to the data object position associated with the potential data object.

20. The radar system as recited in claim 19, wherein the radar system performs further operations to:
   in response to determining the detection velocity of the detection is within the velocity threshold to the data object velocity of the potential data object or determining the tracklet position of the tracklet is within the position threshold to the data object position of the potential data object:
      calculating the respective joint cost estimation using the detection information or the tracklet information; and
      select, as the data object from the plurality of potential data objects, a potential data object has a lowest joint cost estimation relative to other potential data objects in the plurality of potential data objects.

* * * * *